United States Patent [19]

Brown et al.

[11] 4,311,028
[45] Jan. 19, 1982

[54] FLEXIBLE COUPLINGS

[76] Inventors: Peter S. Brown, R.F.D. 2, Warren, Me. 04864; Samuel H. Tibbetts, P.O. Box 82, Rockport, Me. 04856

[21] Appl. No.: 97,305

[22] Filed: Nov. 26, 1979

Related U.S. Application Data

[63] Continuation of Ser. No. 861,683, Dec. 19, 1977, abandoned.

[51] Int. Cl.³ .............................................. F16D 3/58
[52] U.S. Cl. .................................... 64/28 R; 64/9 A; 64/14; 64/27 NM
[58] Field of Search ............ 64/9 A, 9 R, 14, 27 NM, 64/28 R, 30 D

[56] References Cited

U.S. PATENT DOCUMENTS

| | | | |
|---|---|---|---|
| 1,220,483 | 3/1917 | Williams et al. | 64/9 A |
| 1,261,962 | 4/1918 | Scott | 64/9 R |
| 2,326,450 | 8/1943 | Fawick | 64/14 |
| 2,828,161 | 3/1958 | Whitney | 64/28 R |
| 2,989,857 | 6/1961 | Helland et al. | 64/9 R |
| 3,729,953 | 5/1973 | Wanzer | 64/9 A |
| 3,977,212 | 8/1976 | Johansson | 64/14 |

FOREIGN PATENT DOCUMENTS

| | | | |
|---|---|---|---|
| 1338026 | 10/1962 | France | 64/9 A |
| 45-568170 | 2/1970 | Japan | 64/14 |
| 575163 | 2/1946 | United Kingdom | 64/14 |
| 2022771 | 12/1979 | United Kingdom | 64/14 |

Primary Examiner—Ira S. Lazarus
Assistant Examiner—Magdalen Moy

[57] ABSTRACT

Flexible couplings have either their drive or their driven members freely rotatable within the chambers of the other members with a predetermined working clearance between them and with their proximate surfaces formed with lengthwise and radially aligned channels defining retaining passages for elastomeric splines which permit torque-applying and spline-compressing forces to be transmitted between the chamber and the entrant member thus causing the turning thereof and the misaligning forces to be resiliently accommodated. The chambers may be integral parts of the members or they may be sleeves in which case the drive and driven members are or may be identical and connected to the sleeves.

10 Claims, 5 Drawing Figures

FLEXIBLE COUPLINGS

This is a continuation of application Ser. No. 861,683, filed Dec. 19, 1977 and now abandoned.

BACKGROUND REFERENCES

U.S. Pat. No. 2,220,622
U.S. Pat. No. 2,326,450
U.S. Pat. No. 3,621,625
U.S. Pat. No. 3,729,953

BACKGROUND OF THE INVENTION

Flexible couplings of various types have been proposed for use where misalignment exists or may exist between coupled driving and driven elements, where the transmission of shock from one element to the other is to be minimized, or when both situations are or may be encountered.

One type of flexible coupling provided elastomeric cushioning means between sets of driving and driven portions that prevented their direct engagement while permitting the relative movement required to minimize shock and accommodate misalignment forces. Couplings of this type are disclosed in the patent to Homer U.S. Pat. No. 2,220,622 and the patent to Conaghan et al U.S. Pat. No. 3,621,675.

The patent to Fawick U.S. Pat. No. 2,326,450 disclosed a coupling in which one set of portions was a series of circular chambers concentric with the shaft with an adjustable elastomeric unit in each chamber. The chambers were intersected by an annular slot dimensioned to receive the other set of portions shown as a series of rigid fingers, one between each two units with the drive to be dependent on the pressure exerted against the walls of the chambers. As the fingers were a fit in the annular slot, the accommodation of misalignment forces was at best quite limited.

Flexible couplings of the above types, while pertinent to the present invention in that resilient shock cushioning means were disclosed, as far as we are aware, always provided that the driving force was circumferentially applied, that is, the driven set of portions was in the direct path of the driving set of portions, an arrangement avoided by the present invention. The patent to Wanzer U.S. Pat. No. 3,729,953 disclosed a flexible coupling in which the sets of driving and driven portions were radially aligned grooves or channels, one set internally of a member having a chamber and the other set exteriorly of a member within the chamber with corresponding channels of the two sets positively connected by roller bearings, each of a type tapering towards both ends from its groove-fitting center. While the use of such bearings enabled misalignment forces to be accommodated, the transmission of shock from one element to the other could not be prevented. The arrangement of the members, one within a chamber of the other and the provision of the radially aligned grooves is a construction necessary to the present invention.

THE PRESENT INVENTION

The general objective of the present invention is to provide flexible couplings that are better suited to meet a wider range of actual requirements than the couplings with which we are familiar, the couplings in accordance with the invention having drive and driven members with the transmission of torque from one to the other only through flexible elastomeric splines capable of withstanding a predetermined maximum torque and to release the coupled members if such maximum torque is exceeded, the coupling capable of effective use even where the axes of the elements to be coupled are misaligned where they are to be connected, and the construction such that the torque transmitting capacity of the couplings can be varied within a substantial range by the selection of conventional elastomeric cord stock having an appropriate durometer rating for use as the splines to provide a wanted torque capacity.

In more detail, those general objectives are attained with a flexible coupling having a first member attachable to one of the two elements to be coupled and provided with a cylindrical chamber. A second member is attachable to the other element and is dimensioned to so fit within the chamber as to be rotatable independently thereof with predetermined clearance. The chamber and the member entrant thereof each have a parallel series of channels extending lengthwise thereof, both series of the same number and the channels so arranged and dimensioned that corresponding ones of the two series may be radially aligned to provide lengthwise passages of uniform cross sectional area. A series of elastomeric splines are provided, one for each such passage, each extending lengthwise thereof and dimensioned to be normally substantially uncompressed therein and having characteristics such that driving torque is delivered diagonally through the splines from the driving margins or shoulders of one of the confining channels against the diagonally opposite driven margins or shoulders of the other confining channels with the splines resiliently compressed from end-to-end by the driving torque and also compressed by misalignment forces but permitting free rotation of the second members if circumferential shear forces prevail.

Another objective of the invention is to provide such flexible couplings for use where the driving element is a flywheel and particularly where its axis is vertical. In order to couple the driven element thereto, the first member of the coupling includes a chamber open at both ends and is secured to the driving element. Aligned seats are provided, one centered and held by the driving element and the other by the proximate end of the second member with a ball confined therebetween. Where the axes of the elements are vertical, the weight of the driven element and any device driven thereby is borne by the bottom seat.

Another objective of the invention is to provide a coupling for use where the drive and driven elements are both shafts and it is desired that the coupling be flexible relative to both. This objective is attained by providing that one of the members consists of a first part that is or may be identical to the other member and the chamber is a sleeve having its channels of sufficient length to overlie both members and connected thereto by elastomeric splines which desirably extend substantially the full length of the sleeve channels.

Other objectives, novel features and advantages of the invention will be apparent from the following description of preferred embodiments and the appended claims.

BRIEF DESCRIPTION OF THE DRAWINGS

In the accompanying drawings, preferred embodiments of the invention are illustrated of which

THE PREFERRED EMBODIMENTS OF THE INVENTION

Figure 1:
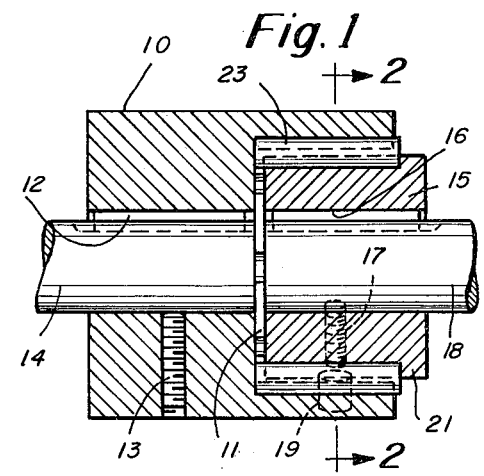
FIG. 1 is a vertical section taken through a flexible coupling in accordance with one embodiment of the invention.
Figure 2:
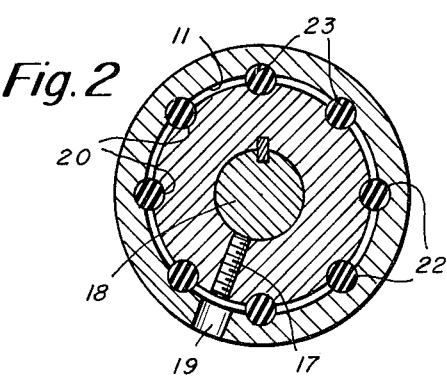
FIG. 2 is a section taken approximately along the indicated line 2—2 of FIG. 1.

The embodiment of the invention illustrated by FIGS. 1 and 2 consists of a member 10 having an axial, open ended, cylindrical chamber 11. The member 10 has a lengthwise keyway 12 and a set screw 13 by which means the member 10 may be anchored as well as keyed to the end of the shaft 14. A second member 15 has a lengthwise keyway 16 and a set screw 17 enabling the second member to be anchored as well as keyed to the end of the shaft 18. The second member is dimensioned to fit freely within the chamber 11 with a predetermined clearance and the chamber 11 has a port 19 through which the set screw 17 is accessible. While either shaft may be the drive shaft, the shaft 14 is here referred to as the drive shaft and the shaft 18 as the driven shaft.

The second member 15 has a series of circumferentially spaced channels 20 extending lengthwise from its chamber entering end but terminating short of its other end to provide stops 21. The chamber 11 has a series of circumferentially spaced channels 22 extending inwardly from its open end, one channel 22 for each channel 20 and spaced and dimensioned so that it may be radially aligned therewith to define passageways to accommodate and contain elastomeric splines 23 held therein by the stops 21.

The elastomeric splines 23 are dimensioned to fit the passageways without being compressed and are selected to provide driving connections between the chamber 11 and the driven member 15 capable of withstanding a predetermined maximum torque but being somewhat compressed under normal conditions and as may be required to accommodate any misalignment forces.

Figure 3:
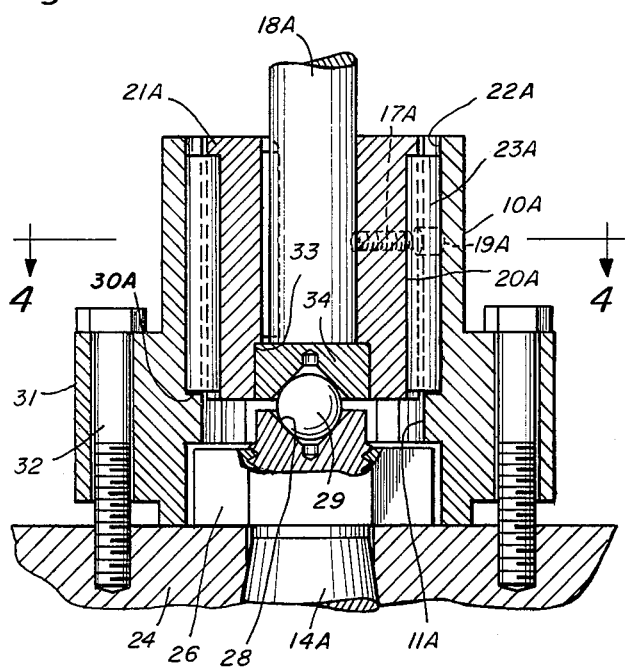
FIG. 3 is a section taken lengthwise of a flexible coupling in accordance with another embodiment of the invention.
Figure 4:
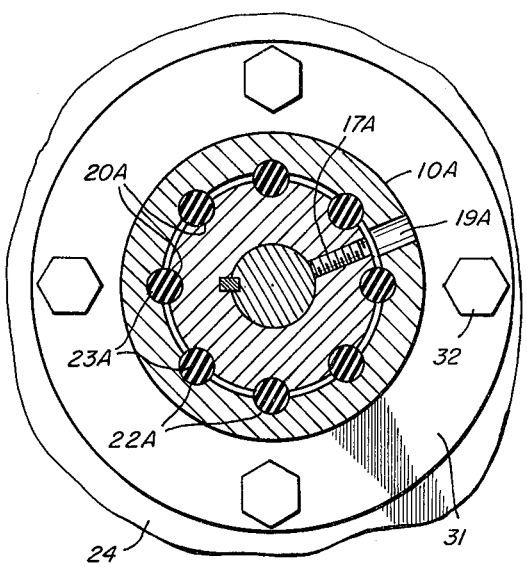
FIG. 4 is a section taken approximately along the indicated line 4—4 of FIG. 3.

In the embodiment of the invention illustrated by FIGS. 3 and 4 parts that correspond to those of the previously described embodiment are identified by the same numerals but these are distinguished by the suffix addition "A" and this coupling is particularly for use where the part to which the member 10A of the coupling is to be attached is a fly wheel 24 and, as shown, its axis may be vertical. Such a fly wheel is typically locked to a drive shaft 14A by a nut 26 threaded on the upper shaft end and, in accordance with the invention the shaft end has an axial retaining seat 28 for a ball 29.

The chamber 11A is open at both ends and its channels 22A are shown as terminating short of the end of the chamber proximate to the fly wheel to provide stops 30 for the elastomeric splines 23A. Likewise, the opposite end of channels are shown as terminating short of the opposite end of the chamber 11A to define a stop 30A for the splines 23A as shown in FIG. 3 of the drawings. The drive member 10A also differs from the drive member 10 in that it is flanged as at 31 to enable it to be secured to the fly wheel 24 by bolts 32. The clearance between the chamber 11A and the driven member 18A and the use of the elastomeric splines 23A enable misalignment forces to be accommodated and such forces may result from the fact that the axis of the drive member 10A may not coincide precisely with the axis of the drive shaft 14A where it is to be coupled thereto or because the outer end of the driven shaft 18A is not securely held.

It will be seen that the end of the driven member 18A proximate to the fly wheel has an axial socket 33 providing a press fit for retaining seat 34 for the opposite portion of the ball 29 so that the driven shaft 18A is or may be wholly supported by the drive shaft 14A.

Figure 5:
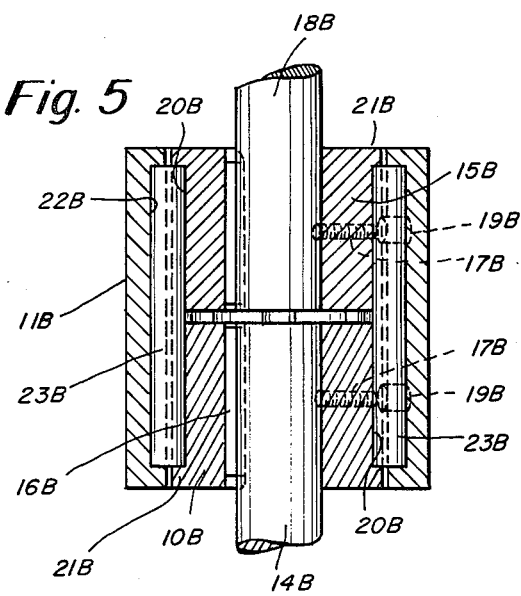
FIG. 5 is a lengthwise section of a flexible coupling in accordance with yet another embodiment of the invention.

The embodiment of the invention illustrated by FIG. 5 is for use where it is desired that the coupling be flexible relative to the drive and driven shafts and corresponding parts are indicated by the appropriate reference numerals to which the suffix "B" has been added.

In this embodiment of the invention the chamber 11B is a separate part and in the form of a sleeve. The member 10B fixed on the shaft 14B which is or may be the drive shaft is or may be identical to the driven member 15B fixed on the shaft 18B which is or may be the driven shaft. The sleeve 11B is of sufficient length to overlie the drive and driven members which have the corresponding ones of their channels in alignment and the channels 22B are shown as terminating short of each end of the sleeve. The elastomeric splines 23B are of sufficient length so that each may enter the corresponding channels of both the driving and driven members.

In all embodiments of the invention the driving torque is applied diagonally through the elastomeric splines and the clearances ensure that misalignment forces can be accommodated.

Turning now to the elastomeric splines, we have found that flexible splines of cord stock such as used in forming seals is well suited for use. Such stock is widely available in various dimensions and in a substantial range of durometer ratings. While the splines used depend on the torque transmission requirements of each use, we have found that Buna-N cord stock the diameter of which was one-quarter of an inch and its durometer rating 65 was such that a single spline could transmit about one-half horse power. Cord stock formed from other materials are, of course, accessible and can be used for our purposes. In practice, hydraulic pumps have been successfully operated utilizing flexible couplings of the type illustrated by FIGS. 3 and 4 as power take-offs from the fly wheel of outboard motors with the transmitted horse power in the neighborhood of five horse power.

While the above is by way of illustration and not of limitation, it makes it apparent that a coupling having its spline-receiving passages of one selected diameter, may be adapted to transmit a selected torque within a wide range by utilizing cord stock of the same diameter of an appropriate durometer reading. At present, durometer rating range of such stock is in the approximate range of from 40–80 and is of course available in various other diameters. While one of the advantages of the invention is that flexible couplings in accordance with the invention may be of small size and capable of relatively heavy duty, they may be made in various sizes and the spline-receiving passages may be of any diameter for which suitable spline material is available.

It will be appreciated that in the event the maximum torque is exceeded, the splines will be sheared thus avoiding damage to the equipment. When the cause of failure has been corrected, new splines may be quickly and easily replaced by releasing one of the members so that it may be slid relative to the other to an extent enabling the new splines to be inserted.

From the foregoing, it will be apparent that flexible couplings in accordance with the invention are adapted to a wide range of uses of which shaft couplings and power take-offs for engines and motors are typical examples. The couplings have the advantages that they are self-aligning, torque limiting, shock absorbing, and easily installed and repaired.

We claim:

1. A flexible coupling for use in connecting drive and driven elements, said coupling including a first member attachable to one element and having an axial chamber having first and second ends and open at least at its first end, a second member having first and second ends, said second member attachable to the other element and dimensioned to be freely rotatable within said axial chamber and provide a substantial annular clearance between the periphery of the second member and said chamber, said second member entrant into said chamber through the open end of said first member and spaced inwardly in said chamber from the second end of the first member, the interior of said first member and the exterior of said second member each having a series of the same number of channels corresponding ones of said series aligned to provide lengthwise passages, a plurality of elastomeric splines, one for each passage and extending lengthwise of and confined therein, the diameter of said splines such as to be a substantially uncompressed fit in said passages, the channels and splines providing the sole driving connections between the members with the driving torque exerted by one member applied diagonally through the splines from the driving margins of one series of channels to the diagonally opposite channel margins, said splines being resiliently compressed from end-to-end by driving torque and also by angular misalignment forces and accommodative of such forces until fully compressed, and stop means on both the first and second member closing opposite ends of the channels of the said first and second member the length of said splines such that the ends of the splines are in engagement with the corresponding stops and hold said second member from the second end of said first member, said splines having a selected durometer rating such that they become increasingly compressed until fully compressed when a predetermined maximum torque is exerted and are then subject to shear if that maximum torque is exceeded.

2. The flexible coupling of claim 1 in which the splines are also resiliently compressed from end-to-end by eccentric misalignment forces.

3. The flexible coupling of claim 1 in which the chamber is a part of the other of said members.

4. The flexible coupling of claim 3 in which the channels of said one member terminate short of the outer end thereof, said one member includes first means enabling the slidable attachment thereof to the other element and second means enabling said one member to be anchored thereto against such movement.

5. The flexible coupling of claim 1 in which the chamber is an open ended sleeve and the other member is dimensioned to be freely rotatable therein and there is a second spline connection between the sleeve and said other member.

6. The flexible coupling of claim 5 in which the second spline connection includes a series of circumferentially spaced channels on the exterior of said other member, each aligned with a corresponding channel of said one member, the channels of the sleeve are dimensioned to overlie the channels of said other member, and the splines are the same length as said sleeve channels.

7. The flexible coupling of claim 6 in which the sleeve channels terminate short of the ends of the sleeve and at least one of the members includes means enabling the attachment to one of the elements to be slidable relative thereto and means enabling the anchoring thereof against such sliding movement.

8. The flexible coupling of claim 1 in which said first element is an assembly including a fly wheel and a crankshaft having an end extending through the fly wheel and formed with a seat, the chamber is part of the first member, the first member includes means enabling the attachment thereof to the fly wheel and has a port located to overlie the shaft end and opening into the chamber, the second member includes a seat proximate the shaft seat, and a ball is confined between said seats.

9. The flexible coupling of claim 8 in which the channels of the chamber terminate short of the port.

10. The flexible coupling of claim 9 in which the channels of the second member terminate short of the end thereof opposite said seats, and the second member includes first means enabling the slidable connection of the second member to the other element and second means operable to prevent or permit the second member from sliding relative to said other element.

* * * * *